United States Patent Office 3,328,198
Patented June 27, 1967

3,328,198
FIBER-REINFORCED FOAMS AND PROCESS FOR THE PRODUCTION THEREOF
Charles Richard Koller, Wilmington, Del., assignor to E. I. du Pont de Nemours and Company, Wilmington, Del., a corporation of Delaware
No Drawing. Filed Apr. 12, 1963, Ser. No. 272,544
7 Claims. (Cl. 117—120)

This application is continuation-in-part of copending application Ser. No. 787,662, filed Jan. 19, 1959, now Patent No. 3,085,922.

This invention relates to the manufacture of fiber-reinforced synthetic polymer foams and more particularly to the manufacture of such foams in a manner whereby the fibrous component assists in achieving a desired degree of porosity during the cell formation step.

Various attempts have heretofore been directed toward the utilization of fibers and filaments in the production of synthetic polymer foam articles. To a large extent, it has been felt that the distribution of fibers within a foam structure might advantageously serve to improve such properties as load support, dimensional strength, tear strength and the like. In general, however, such attempts have been largely unsuccessful for the reason that the presence of fibers during the foaming action seriously impedes cell formation. Quite commonly, fibers so employed markedly increase the bulk density of the resultant products in comparison with that which would be obtained absent the fibers. As a consequence, the products become more expensive and provide reduced properties with respect to insulation, flexibility, etc.

Accordingly it is an object of the invention to provide a method for the manufacture of fiber-reinforced foams whereby the fibrous component acts to facilitate rather than impair cell formation. Another object of the invention is to provide a process for uniformly incorporating reinforcing fibers throughout a synthetic foam to any desired degree of loading. Still another object involves the preparation of fiber reinforced synthetic polymer foam articles possessing improved properties of load support and tear strength. A further object involves the utilization of fibers in a forming step in such a manner as to permit unusually low bulk density products of outstanding load support characteristics. Other objects will be apparent from the description of the invention given below.

In accordance with the invention, there is provided a method for producing a low density fiber-reinforced foam article comprising (1) providing a compressible porous bonded fiber structure having a high recovery from compression and a fiber density of 0.2 to 4 lbs./ft.$^3$, said porous bonded fiber structure being composed of substantially parallelized, crimped, synthetic organic, polymeric fibers which are attached at a plurality of contact points throughout the three dimensions of the structure, (2) impregnating said porous bonded fiber structure throughout by successively compressing and releasing said structure while in intimate contact with a fluid, foamable, curable, synthetic polymer composition, and (3) while the resultant impregnated structure is in an essentially uncompressed state, solidifying and curing said synthetic polymer composition to create a substantially continuous cellular network distributed throughout the three dimensions of said porous bonded fiber structure.

The utilization of an initial bonded fiber structure as described above in accordance with the method of the invention, differs greatly from prior art endeavors toward the production of fiber-reinforced foams. Such other methods have generally employed loose or unbonded assemblies of fibers with little or no concern to the particular arrangement of the fibers, or to the porosity or compressional properties which an assembly thereof might afford. In practicing such other methods it has been common to regard the fibers in the nature of fillers or extenders which, although contributing to certain properties of the final product, play little or no part in the foaming operation itself. As mentioned above, it has been frequently experienced with such methods that the fibers tend to restrain cell formation such that the more economical lower bulk density products have not been obtained.

According to the practice of the present invention, the particular bonded fiber structure effectively overcomes the problems heretofore encountered in preparing fiber-reinforced foams. Being highly porous in character and yet bonded in the form of an integral structure, it is capable of being permeated throughout by the foamable polymer composition. By virtue of its resiliency properties, it can be compressed in intimate contact with the foamable polymer composition followed by a spontaneous return to its original shape upon release of the compressive forces. Upon the application and release of such forces, the foamable polymer composition can be caused to thoroughly and uniformly permeate the fiber structure, e.g. similar to the manner in which a sponge picks up water and yet is restored to generally its original shape upon squeezing and releasing it in a bath of water. The initial fiber assembly accomplishes still a further function in the process of this invention; namely, that owing to its self-supporting character, it provides a preformed network within which cell formation can be freely effected. In essence, the bonded fiber structure can be made to support the foamable mixture in a dispersed form such that during the subsequent foaming process, cells can grow with comparatively little physical restraint. Accordingly it becomes practical to fabricate foams of lower bulk densities than could be obtained absent the fibers. In terms of the products so obtained, the bonded fiber assembly provides improved properties with respect to strength and load support without sacrificing other properties such as those relating to insulation and flexibility.

A full description of methods for producing the initial bonded fiber structures employed in accordance with this invention for the production of fiber-reinforced foam articles is set forth in C. R. Koller U.S. application Ser. No. 787,662, filed Jan. 19, 1959, now U.S. Patent No. 3,085,922. These structures are of a porous flexible character and are composed of substantially parallelized crimped, synthetic organic polymeric fibers which are attached by a binder composition at a plurality of contact points throughout the three dimensions of the structure. Although a description of these materials, including definitions of the terms used in connection therewith, is fully set forth in the above Koller application, they will be briefly mentioned herein.

By "crimped," alternatively "contorted," it is meant that the profile (i.e. side elevation) of an individual fiber is irregular (i.e. not straight) when the fiber is viewed from at least one side. By "substantially parallelized," it is meant that although the fibers are crimped, the mean axes of individual fibers are substantially parallelized, i.e. aligned generally in the same direction. This orientation may be further illustrated by considering individual fibers to be surrounded by a circumscribing envelope or cylinder; the mean axes of these envelopes are substantially parallelized. The angle formed by the substantially parallelized fibers with the plane of a face of a structure formed thereof be at least 10° and, more commonly, essentially 90°. By virtue of the crimped, substantially parallelized arrangement of the fibers, they "overlap" one another; that is, in at least one view, a fiber crosses over, with or without touching or attachments, an adjacent fiber. As a consequence the fibers are said to "coact" in that the crimp and relative placement of the fibers are such that they assist one another in producing and maintaining the generally parallelized character both with respect to the general alignment of the fibers and their spacing with respect to each other.

The fibrous structures as described in the aforementioned Koller application can be prepared by a method which comprises forming a plurality of bodies containing substantially parallelized fibers, either per se or in the form of other suitable filamentary structures, placing the bodies in a mold and forming a block while keeping the fibers substantially parallelized, impregnating the block with a binder composition, curing or otherwise solidifying the binder, and cutting the resulting block to a desired shape. For many of the products of the present invention, such a block will be cut at an angle of at least 10° to the plane of orientation of the fibers to obtain a porous, self-supporting material in the form of a sheet, cube or other polyhedral shaped structure. Curved shaped assemblies can also be carved from such a block.

In accordance with the invention, the production of fiber-reinforced foam articles requires a judicious selection of the fibrous and non-fibrous components and a critical arrangement thereof. Important considerations leading to the attainment of sutiable bonded fiber structures will now be described in greater detail.

The fiber density of the bonded fiber structure, in particular, markedly affects the functional properties of the resultant articles. It has been found that the fiber density of the structure in the final article should be between about 0.2 and 4 pounds/ft.$^3$. Fiber densities of 1.5 pounds/ft.$^3$ or less are preferred for reasons of economies. The fiber density reported in pounds per cubic foot is a measure of the density of the fibers in the article per se, e.g. exclusive of any further layers or material with which the article might be combined. It is calculated by dividing the effective pile weight of the fibers in the article by the volume these fibers occupy when the specimen is under a barely perceptible load, e.g. of 0.01 p.s.i. The volume in turn is determined by multiplying the average width by the average length of the conditioned specimen by the effective height, and then applying suitable conversion factors to obtain the volume in units of cubic feet.

The initial crimped fiber to be used in preparing the bonded fiber structures may be in any of a variety of forms, for example, carded webs of substantially aligned staple fibers or bodies of substantially aligned filamentary structures prepared from a warp of sliver, top, roping, roving, tow, stuffer box crimped tow, steam bulked tow, steam crimped continuous filament yarn, gear crimped continuous filament yarn, twist set-back twisted continuous filament yarn, knife edge crimped continuous filament yarn, two-component bulky continuous filament yarn, spun yarns, and many others. Widely differing types of crimp configurations can be imparted to the fibers. Fibers of either two dimensional or three dimensional crimp or combinations thereof can be employed. For example the irregular contortion can be in the form of crimp, e.g., V-shaped, spiral, loopy, zig, zag, sinusoidal, serpentine, multi-cusped, cycloidal, serrated, or any other form of crimp. The irregularity may be in the form of intermittent pronounced proteberances or thickenings along the length of the structure, e.g., flocked-yarns, thick-and-thin yarns (e.g., such as those in U.S. 2,975,474), fuzzy yarns, twisted filaments with fins, twisted ribbon filaments, twisted crescent filaments, twisted elliptical filaments, twisted trilobal filaments, twisted tetralobal filaments, twisted pentalobal filaments, and the like.

In preparing a bonded fiber structure a wide variety of synthetic organic polymeric compositions may be employed. Typical of the fibers and filaments which may be employed are those made of polyamides, such as poly(hexamethylene adipamide), poly(metaphenylene isophthalamide), poly(hexamethylene sebacamide), polycaproamide, copolyamides and irradiation grafted polyamides, polyesters and copolyesters such as condensation products of ethylene glycol with terephthalic acid, ethylene glycol with a 90/10 mixture of terephthalic/isophthalic acids, ethylene glycol with a 98/2 mixture of terephthalic/5-(sodium sulfo)-isophthalic acids, and trans-p-hexahydroxylene glycol with terephthalic acid, self-elongating ethyleneterephthalate polymers, polyhydroxypivalic acid, polyacrylonitrile, copolymers of acrylonitrile with other monomers such as vinyl acetate, vinyl chloride, methyl acrylate, vinyl pyridine, sodium styrene sulfonate terpolymers of acrylonitrile/methylacrylate/sodium styrene sulfonate made in accordance with U.S. Patent 2,837,501, vinyl and vinylidene polymers and copolymers, polycarbonates, polyacetals, polyethers, polyurethanes such as segmented polymers described in U.S. Patents 2,957,852 and 2,929,804, polyesteramides, polysulfonamides, polyethylenes, polypropylenes, fluorinated and/or chlorinated ethylene polymers and copolymers (e.g. polytetrafluoroethylene, polytrifluorochloroethylene), certain cellulose derivatives, such as cellulose acetate, cellulose triacetate, composite filaments such as, for example, a sheath of polyamide around a core of polyester as described in U.S. Patent 3,038,236 and self-crimped composite filaments, such as, two acrylonitrile polymers differing in ionizable group content cospun side by side as described in U.S. Patent 3,038,237 and the like. Blends of two or more synthetic organic fibers may be used, as well as blends of a major weight proportion of synthetic fibers with a minor weight proportion of natural fibers, e.g. silk, wool, mohair, angora and vicuna.

The bonded fiber structures may be prepared from a wide variety of forms of fibers and filaments having any of the above-mentioned compositions, such as, for example, continuous monofilaments, continuous multifilaments, carded webs, warp, sliver, top, roping, roving, tow, bulked tow, bulked continuous filament yarn, spun yarn, batts, felts, papers and other non-woven webs, and the like. The fibers and filaments used as raw material, in addition to being crimped, can be bulked, or unbulked, drawn or undrawn or twisted or untwisted. The denier of the fibers or filaments can vary from about 1 to about 50 denier per filament but preferably is below 12 d.p.f.

For purposes of bonding the fibers together throughout the cushioning member the use of a binder composition is preferred over other techniques such as fusion and solvent coalescence. In general the amount of binder composition to be employed in forming a suitable bonded fiber structure will be an amount sufficient to point bond the fibers in the structure to provide a self-supporting material. The maximum quantity of binder in the structure should generally not exceed the quantity of fiber therein, since amounts in excess thereof tend to make the final products excessively rigid. Preferably the binder density will be between 5 and 100% of the fiber density in a given structure in order to provide a high degree of recovery when released from a compressive force. Irrespective of the proportionate quantity of binder composition, it should be distributed substantially uniformly throughout the structure.

The nature of the binder composition employed to interconnect the fibers at a plurality of contact points along their length throughout the three dimensions of the structure can vary widely. Depending upon the use desired these may be either soluble or insoluble, and may be either thermoplastic in nature or may be thermosetting, e.g. as having been produced by the application of a curable composition followed by treatment with a curing agent, a catalyst, heat, etc. If it is desired to remove the binder a soluble binder will be employed which may be either organic-soluble or water-soluble. Suitable organic-soluble binders include natural rubber or synthetic elastomers (e.g., chloroprene, butadienestyrene copolymers, butadiene-acrylonitrile copolymers), which may be used in the form of a latex dispersion or emulsion or in the form of a solution, vinyl acetate polymers and copolymers, acrylic polymers and copolymers such as polymers of ethyl acrylate, methyl acrylate, butyl acrylate, methyl methacrylate, acrylic acid/acrylic and methacrylic ester copolymers, cellulose nitrate, cellulose acetate, cellulose triacetate, polyester resins such as ethylene terephthalate/ ethylene isophthalate copolymers, polyurethanes such as the polymer from piperazine and ethylene bis-chloroformate, polyamide polymers, and copolymers, methoxymethyl polyamides, vinyl chloride polymers and copolymers such as vinyl chloride/vinylidene chloride copolymer latices. Alcohol soluble polyamide resins are also suitable organic-soluble binders. Suitable water-soluble binders include materials such as polyvinyl alcohol, sodium alginate, acrylic acid polymers and copolymers such as polyacrylic acid, carboxymethyl cellulose, hydroxyethyl cellulose, dextrins, animal glue, soybean glue and sodium silicate. Suitable binders which are insoluble in organic solvents include polytetrafluoroethylene and urea-formaldehyde resin latices.

Additional suitable binder compositions include chlorosulfonated polyethylene; butyl rubbers, such as isobutylene/isoprene copolymers; polyhydrocarbons, such as polyethylene, polypropylene and the like and copolymers thereof; high molecular weight polyethylene glycols sold under the trade name of "Polyox"; epoxide resins, such as the curable epichlorohydrin reaction products with bis-phenols and glycols; polystyrene; alkyd resins, such as polyesters of glycerol with phthalic or maleic acid; polyester resins such as from propylene glycol-maleic anhydride-styrene; phenol-formaldehyde resins; resorcinol-formaldehyde resins; polyvinyl acetals, such as polyvinyl butyral and polyvinyl formal; polyvinyl ethers, such as polyvinyl isobutyl ether; starch, zein, casein, gelatine, methyl cellulose, ethyl cellulose, polyvinyl fluoride, natural gums, polyisobutylene, shellac, terpene resins and rosin soaps. Segmented polymers, such as spandex polymers, polyether amides, polyether urethanes (e.g., those in U.S. 2,929,800) and polyester/urethanes are also suitable.

For purposes of impregnating the bonded fiber assembly with a foamable composition followed by effecting foam formation, several techniques may be employed depending upon the type of foamable composition selected. At least three known methods for foaming, as described more fully hereinafter, are well suited for use in accordance with the invention.

A preferred method for practicing the process of the invention involves dipping the porous resilient bonded fiber structure into a liquid bath containing a foamable composition of suspended particles of plasticized polyvinyl chloride (e.g., a polyvinyl chloride plastisol) and a chemical blowing agent (e.g., N,N'-dimethyl-N,N'-dinitrosoterephthalamide) to thoroughly contact at least the exterior of the structure with the composition. Thereafter the structure is removed from the bath and fed between a pair of pressure rolls to compress the batt to at least 20% of its original thickness. Release of the compressive force causes the structure to reexpand and effects permeation of the composition into the interstices of the structure. By repeatedly compressing and reexpanding the structure several times in this manner, the composition becomes substantially uniformly distributed throughout the structure. The impregnated structure is then heated to cause the blowing agent to release gas; foaming of the polyvinyl chloride plastisol thus ensues throughout the interstices of the structure. Upon further heating a resilient, low density, fiber reinforced porous cured foam is obtained.

A second preferred method for practicing the process of the invention involves the steps of applying to the porous resilient bonded fiber structure a liquid suspension containing a mixture of a polyisocyanate, a polyol and one or more additional ingredients such as water, catalysts, blowing agents and others well known for producing polyurethane foams. The preparation of a foamable polyurethane may involve either the "one shot" technique in which the ingredients are simultaneously mixed or the "two shot" or "prepolymer" procedure. In either case the structure having the foamable composition applied thereto is compressed, again for example by a pair of squeeze rolls. Subsequent release of the compressive forces causes the structure to reexpand with foamable mixture becoming distributed uniformly therethrough. The liquid polyisocyanate composition is then allowed to foam, either with or without applied heat, to generate a mass of cells within the structure. For some purposes a final heating step facilitates final cure of the foam.

A third preferred method for practicing the process of the invention involves the steps of dipping the porous resilient bonded fiber structure into a liquid rubber latex formulation containing soaps, vulcanizing agents and gelling agents as are customarily employed for making foam rubber. Upon repeated steps of compression and release, as for example performed by a pair of squeeze rolls, air is sucked into the impregnated structure as the rubber latex composition becomes uniformly distributed therethrough. The mechanical flexing acts to generate air bubbles throughout the whole volume of the impregnated structure. The chemical gelling agent (e.g., sodium silicofluoride) becomes activated after substantially all the pore formation has been completed, thus coagulating the rubber particles from the liquid latex to form solid gel particles distributed uniformly throughout the structure. A final heating of the gelled structure activates the vulcanizing agent and thereby cross-links the individual gel particles to form cured cellular rubber particles.

Essentially any synthetic polymer composition which can be applied in liquid form and caused to foam, solidify, and cure can be employed in the practice of the invention. Preferred foamable compositions are exemplified by the hydrophobic elastomeric polymers; for example, natural rubber, synthetic rubbers (such as butadiene/acrylonitrile and butadiene/styrene polymers), polyurethanes (such as the known types of polyester and polyether urethanes), hydrocarbon rubbers, such as polyisobutadiene, polyisoprenes, copolymers of ethylene and propylene, and plasticized vinyl chloride polymers. However, in some cases polymers may be employed which give semi-rigid or rigid foams, such as certain formulated polyether polyurethanes. The foamable liquid polymer composition may be provided alone or in the form of suitable suspensions or solutions in aqueous or organic medium. Depending upon the formulation of the polymer composition and, to a lesser extent, the nature of the gelling and curing conditions, the cellular structure of the final foam product may be in the form of closed or open cells or both.

The process of this invention may be performed such as to yield fiber-reinforced foams having total bulk density values up to 12 lbs./ft.$^3$ or more, e.g., such that the maximum individual fiber and foam densities are 4 lbs./ft.$^3$ and 8 lbs./ft.$^3$ respectively. For most cushioning applications, however, greater resiliency and, of course, favorable raw material costs are achieved when the total density is less than 6 lbs./ft.$^3$, as formed with up to 1 lbs./ft.$^3$ of fiber and up to 5 lbs./ft.$^3$ of foam.

The fact that the sponge-like articles of the invention contain substantially parallelized fibers markedly contributes to the versatility of the articles when employed in combination with other materials. Thus depending upon the direction in which an initially prepared article is sliced or otherwise cut, e.g. transversely or along the direction of filament alignment, fibrous faces can be obtained which differ greatly in terms of the number of filament ends contained therein. For example, an article can be produced in the form of sheet or other polyhedral shaped structures so as to have two opposite faces each composed essentially of ends of the fibers. By adhering one or both of these faces to a backing material, the fibers will be attached in a generally upstanding or "on-end" relationship. For some purposes it will be desirable to adhere to a backing material a face of the foam article containing relatively few fiber ends, e.g. such that the direction of fiber alignment is horizontal or "on-side" with respect to the backing material. The shape and dimensions of the articles to be adhered to a backing will, of course, be a matter of choice depending upon the nature of the intended use.

Typical adhesives for use in cementing the foam articles either together or to one or more backing layers include those materials which are curable to a thermosetting or infusible condition, e.g., polyurethane resins, natural and synthetic rubbers, polyepoxy resins such as those formed from epichlorhydrin and 2,2-bis(parahydroxyphenyl)propane, and polyvinyl chloride resins plasticized by a curable monomeric or polymeric plasticizer. Other adhesives which are not curable but which are insoluble in common solvents are exemplified by polyamide copolymers of hexamethylene diamine and adipic acid/sebacic acid mixtures. Elastomeric adhesives such as those formed of a polyalkylene-ether glycol polyurethane are especially preferred. Illustrative backings are: woven fabrics such as burlap, canvas, and nylon scrim fabrics, knit fabrics such as nylon tricot, non-woven fabrics such as polyethylene or polypropylene fiber webs, resin bonded polyethylene terephthalate fiber webs, papers or cellulosic and/or synthetic fibers, paper felts such as asphalt impregnated cellulose, elastomeric foams and sponges, plastic films such as from polyethylene terephthalate, polypropylene and polyvinyl chloride polymers, metal foils and rigid sheets such as fiber glass reinforced polyester resins, metals, ceramics and wood, elastic, stretchable or shrinkable fabrics and films, and the like.

For purposes of adhering the foam articles of this invention to a backing material, the adhesive can be first applied by ordinary dipping or other coating procedures to either one or both of the faces to be joined. In this respect the adhesive can be caused to form a substantially impermeable layer or barrier between the two components if so desired. Alternatively it may be advantageous for some uses to distribute the adhesive as a discontinuous or porous layer between the two components. The latter can readily be accomplished by spraying a small quantity of a solution or dispersion of the adhesive onto a face of the porous foam article followed by pressing that face into contact with the backing material. Curing, as by means of a curing agent, heat or the like, can if necessary, be then effected.

Aside from the advantages described above which accrue from the process of this invention, it is further significant that the fiber-reinforced foams so obtained can have higher load support, higher tear strength, and lower elongation than fiber-reinforced foams available in the past. In addition, the foams not only contain a more uniform distribution of the fiber throughout the foam but also the pore size of the foam is more uniform; these advantages being chiefly due to the fact that with the process described herein the pore forming reaction is facilitated rather than impaired by virtue of the unique bonded fiber structure.

The present invention is useful for making a wide variety of different fiber reinforced foam products having various shapes, thicknesses and porosities. The fiber-reinforced foams are useful for the production of such articles as cushions, interlinings, sleeping bag inserts, rug pads, insulation for shipping fragile articles, upholstery padding, crash padding, mattress topper pads, wiping, scrubbing and cleaning cloths, etc.

It will be apparent that the products of the invention can be modified by a variety of additives and treatments to impart special qualities to the products. Dyes, pigments, antioxidants, stabilizers, abrasives, fillers, solid soaps, softeners and the like can be incorporated in the articles by means well known in the art.

The following examples will further illustrate the invention. All parts specified therein are by weight unless otherwise indicated.

*Example I*

This example illustrates the preparation of an initial porous, resilient, bonded structure to be used in the preparation of foam articles in the subsequent examples.

Crimped staple fibers of ethylene terepthalate polymer which have a filament denier of 4 and a staple length of 2 inches are processed into a thin carded web 27 inches wide, having a high degree of alignment of the fibers in a direction lengthwise of the web. The fibers, prepared in accordance with Kilian U.S. Patent 3,050,821, have a three-dimensional curvilinear crimp, with a filament crimp frequency of 10 crimps per inch and a filament crimp elongation of 100%. The filament crimp elongation is a measure, in percent, of the amount of crimp as determined from the difference between the extended and relaxed length of a fiber divided by the relaxed length, this quantity times 100. The carded web is wound continuously onto a 2-foot diameter circular drum with a minimum of tension until a layer approximately 10 inches thick is obtained. This layer of fibers is cut in a line transverse to the direction of the fibers and removed from the drum to give a batt of carded fibers measuring approximately 27 inches wide x 75 inches long x 10 inches thick having the fibers all aligned in the same general direction along the length of the batt. The batt is cut at 90° transverse to the direction of the fibers into sections 7 inches long x 10 inches thick and trimmed to 24 inches width. These batt sections are then carefully placed by hand into a perforated metal mold, 24 inches wide x 36 inches long x 7 inches high, having an open top, with the 24 inch by 7 inch sides of the sections face-to-face so that the fibers are all aligned in the same general direction with the fiber ends directed towards the open top and bottom of the mold. As the individual batt sections are placed into the mold, they are gently pushed against each other sideways and released so as to blend and intermingle the fibers in the 24 inch side surfaces of the sections. Considerable overlapping of the fibers is observed at the interfaces between batt sections. A total weight of 984 grams of fiber in batt form fills the mold at this stage. The top is closed on the mold and cotton threads are inserted by means of a long needle from one side to the other through the perforated mold and fiber assembly at 6 inch intervals in a horizontal plane approximately ½ in. from the top and bottom of the mold to aid in maintaining the fibers in their given positions during impregnation with binder solution.

The filled mold is then turned with its 24 inch side standing vertically and in this position it is slowly lowered and immersed into a tank of binder solution freshly prepared as follows: 2920 grams of the viscous reaction product of a 1.6:1.0 molar ratio of 2,4-toluene diisocyanate and polytetramethylene ether glycol (M.W.=1000) are dissolved with 895 g. of castor oil in 32 gal. of perchloroethylene. To this solution is added a solution of 29.8 grams of 4,4'-methylene-bis(2-chloroanilne) dissolved in 425 ml. of methylene chloride. The mold is slowly withdrawn from the binder solution and allowed to drain 20 minutes. The mold is turned over with the opposite side down and heated in an oven with air at 300° F. passing through the structure for 2 hours to cure the binder. The fiber structure after removal from the mold consists of overlapped and touching fibers uniformly bonded together throughout. One portion of the porous, resilient self-supporting structure is found to have a fiber density of 0.62 lb./ft.$^3$, a binder content of 6.5% on the weight of fiber and a specific volume at 0.15 p.s.i. of 107 cc./gm.

*Example II*

A 7" x 7" x 5" thick structure having the fibers directed generally toward the 7" x 7" faces is sliced from the block prepared in accordance with Example I.

A formable rubber latex composition is made in the following manner. To 91.3 gms. of a 58% solids latex blend of 70 parts natural rubber latex and 30 parts styrene butadiene rubber latex is added 5 grams of a composite during agent dispersion comprising a 53% solids mixture of sulfur and zinc dialkyl dithiocarbamate accelerator. The resultant mixture is stirred slowly for a period of 12 hours at approximately 80° F. Thereafter 6 grams of a zinc oxide dispersion (51% solids) and 0.6 gm. of a fatty acid salt wetting agent (21% active agent) is added with stirring. To this mixture is added with stirring 1.5 gms. of a sodium silicofluoride dispersion (53% solids) and the mixture is then used immediately.

The foamable compounded rubber latex mixture is poured into a shallow pan of approximately 10" x 10" size. The bonded fiber structure is then placed in the pan and compressed with a perforated metal plate to a small thickness so that the fibers are wetted with the rubber latex. The fiber assembly is allowed to recover its original form. This compression and recovery cycle is repeatedly carried out for several minutes so as to cause the rubber latex to froth and foam uniformly throughout the entire fiber assembly. The fiber assembly is then allowed to stand in its expanded state until the foam rubber gells, this requiring about 5 minutes. The gelled structure is then placed in a hot air circulating oven at 250° F. for a period of 30 minutes to cure the foam rubber. There is obtained a bonded fiber structure with foam rubber uniformly distributed throughout its three dimensions. The article is found to have a total density of 1.73 lbs./ft.$^3$ and a foam rubber density of 0.95 lb./ft.$^3$. The product exhibits desirable compressional characteristics suitable for cushioning and has outstanding tear resistance properties. A four inch thick sample is found to retain 99.2% of its original thickness after being compressed 600 times with a 1.5 p.s.i. load in a cushion tester and allowed to recover for 24 hours.

The above cushion article is sliced parallel to the two surfaces containing fiber ends to provide 1" and ⅛" thick samples. The 1" thick layer is useful for chair arm padding. One fiber end face of each of two ⅛" thick samples is treated with a curable polyurethane resin adhesive and then both treated surfaces are laminated under slight pressure to either side of a woven scrim fabric. This laminate is useful as a dust cloth.

*Example III*

In accordance with Example I a bonded fiber structure 18" wide x 36" long x 4" thick is made such that the fibers are oriented generally parallel to the 18" x 36" faces and perpendicular to the 18" x 4" sides. This structure is found to have a fiber density of about .45 lb./ft.$^3$ and a binder content about 10% based on the weight of the fiber.

A foamable polyurethane composition is prepared continuously by separately metering to a high speed foam mixing head (a) 48.5 parts by weight of tolylene diisocyanate (80/20 blend of the 2,4- and 2,6-isomers) and (b) a mixture formed of:

| Ingredient— | Parts by wt. |
|---|---|
| Polypropyleneethertriol of M.W. 3000 | 100 |
| Silicone oil copolymer of polydimethylsiloxane and polyalkylene ether | 1 |
| Triethylene diamine catalyst | 0.2 |
| Stannous octoate catalyst | 0.3 |
| Water | 3.9 |
| Trichlorofluoromethane | 7 |

This foam mix is applied continuously to the top (18" x 36" face) of the bonded fiber structure which is immediately placed between two layers of polyethylene coated paper and passed at 5 yds./min. through a pair of squeeze rolls set at 0.5 inch opening to spread the foam mix throughout the fiber structure. After emerging from the squeeze rolls the bonded fiber structure regains its initial thickness and the polyurethane mixture proceeds to foam throughout the bonded fiber structure. The assembly is then placed in a hot-air circulating oven at 270° F. for 1 hour to cure the polyurethane foam. There is obtained a bonded fiber structure with a cellular polyurethane foam uniformly distributed throughout the fiber network. The fiber reinforced foam structure, having a total density of about 2.9 lbs./ft.$^3$, exhibits excellent compressional characteristics, recovery properties and high tear strength. As a consequence it is especially desirable for cushioning applications.

*Example IV*

The procedure of Example III is repeated but employing the following foamable polyvinyl chloride plastisol composition in place of the polyurethane:

| Ingredient— | Parts by wt. |
|---|---|
| Vinyl chloride polymer | 100 |
| Didecylphthalate plasticizer | 100 |
| Calcium oxide | 1 |
| Fatty alcohol sodium sulfate | 1.6 |
| Liquid barium-cadmium based stabilizer | 3 |
| Epoxy fatty acid stabilizer | 2 |
| Sulfonate complex of an oil soluble alkyl aryl petroleum sulfonate (41% active ingredient in mineral oil) | 3.6 |
| N,N'-dimethyl, N,N'-dinitrosoterephthalamide blowing agent (70% active ingredient in mineral oil) | 10 |

The ingredients are thoroughly mixed to form a smooth plastisol and thereafter applied to the bonded fiber in the manner described in Example III. Upon heating in a circulating, hot-air oven at 320–350° F. for 30 minutes a medium density foam of good compressional and strength properties is obtained.

What is claimed is:

1. Method for producing a low density fiber-reinforced foam article comprising (1) providing a compressible porous bonded fiber structure having a high recovery from compression and a fiber density of 0.2 to 4 lbs./ft.$^3$, said porous bonded fiber structure being composed of substantially parallelized, crimped, synthetic organic, polymeric fibers which are attached at a plurality of contact points throughout the three dimensions of the structure, (2) uniformly impregnating said porous bonded fiber structure throughout by repeatedly compressing and releasing said structure while in intimate contact with a fluid, foamable, curable, synthetic polymer composition, and (3) while the resultant impregnated structure is in an essentially uncompressed state, solidifying and curing said synthetic polymer composition to create a substantially continuous cellular network distributed throughout the three dimensions of said porous bonded fiber structure.

2. Method of claim 1 wherein said polymer composition comprises a foamable rubber latex and wherein the porous bonded fiber structure is repeatedly compressed and released in intimate contact therewith to mechanically induce cell formation.

3. Method of claim 1 wherein said polymer composition comprises a foam in place of polyurethane.

4. Method of claim 1 wherein said polymer composition comprises a foamable polyvinyl chloride plastisol.

5. Method of claim 1 wherein said compressing is effected by passing said porous bonded fiber structure in intimate contact with said polymer composition through a pair of turning squeeze rolls.

6. Method of claim 1 wherein said solidification and curing is effected at elevated temperatures.

7. The product produced by the method of claim 1.

References Cited

UNITED STATES PATENTS

| | | | |
|---|---|---|---|
| 2,785,739 | 3/1957 | McGregor et al. | |
| 2,843,505 | 7/1958 | Riedel | 117—140 X |
| 2,972,554 | 2/1961 | Muskat et al. | 117—140 X |
| 2,993,813 | 7/1961 | Tischbein | 117—140 X |
| 3,035,943 | 5/1962 | Nottebohm et al. | 117—140 |

ALFRED L. LEAVITT, *Primary Examiner.*

E. B. LIPSCOMB III, *Assistant Examiner.*